Nov. 7, 1961     G. W. KAMIN     3,007,465
SURFACE COOKING UNIT
Filed April 20, 1959     2 Sheets-Sheet 1
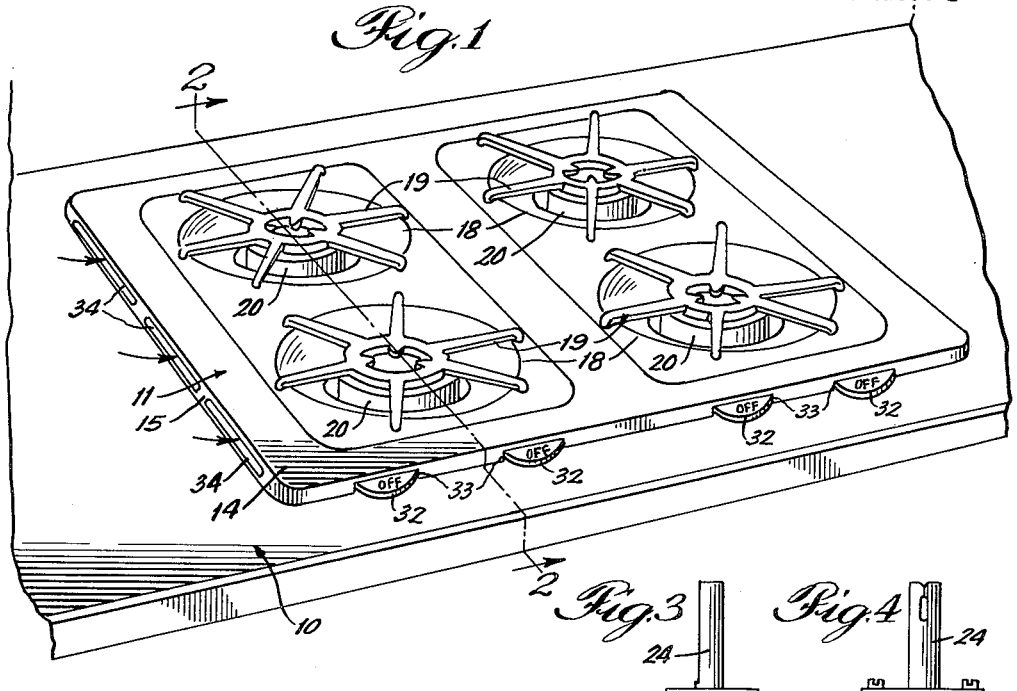
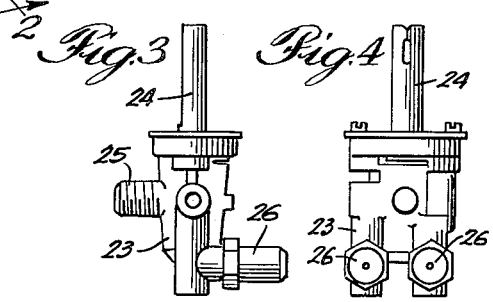
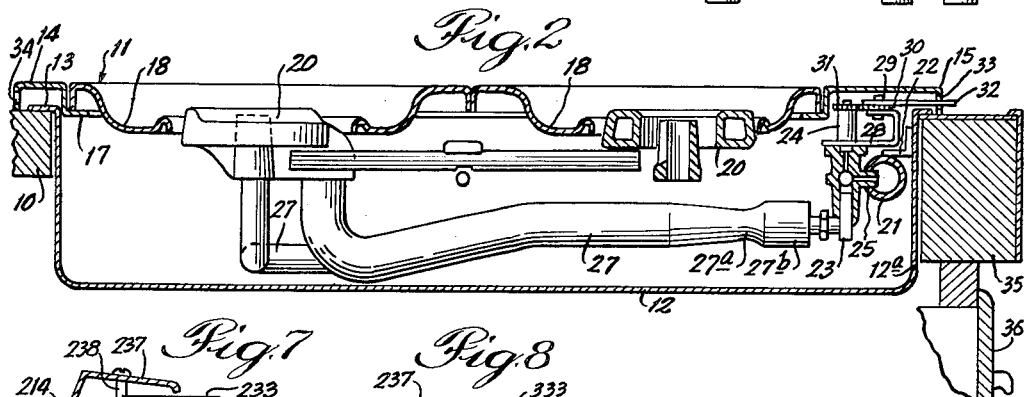
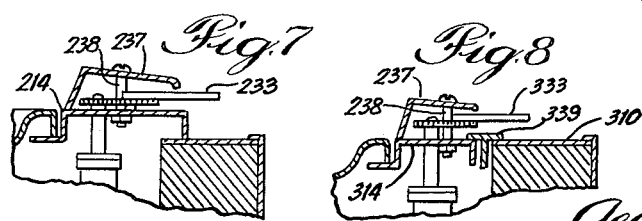
INVENTOR:
George W. Kamin,
BY Dawson, Tilton, Fallon & Lungmus,
ATTORNEYS.

Nov. 7, 1961 G. W. KAMIN 3,007,465
SURFACE COOKING UNIT
Filed April 20, 1959 2 Sheets-Sheet 2
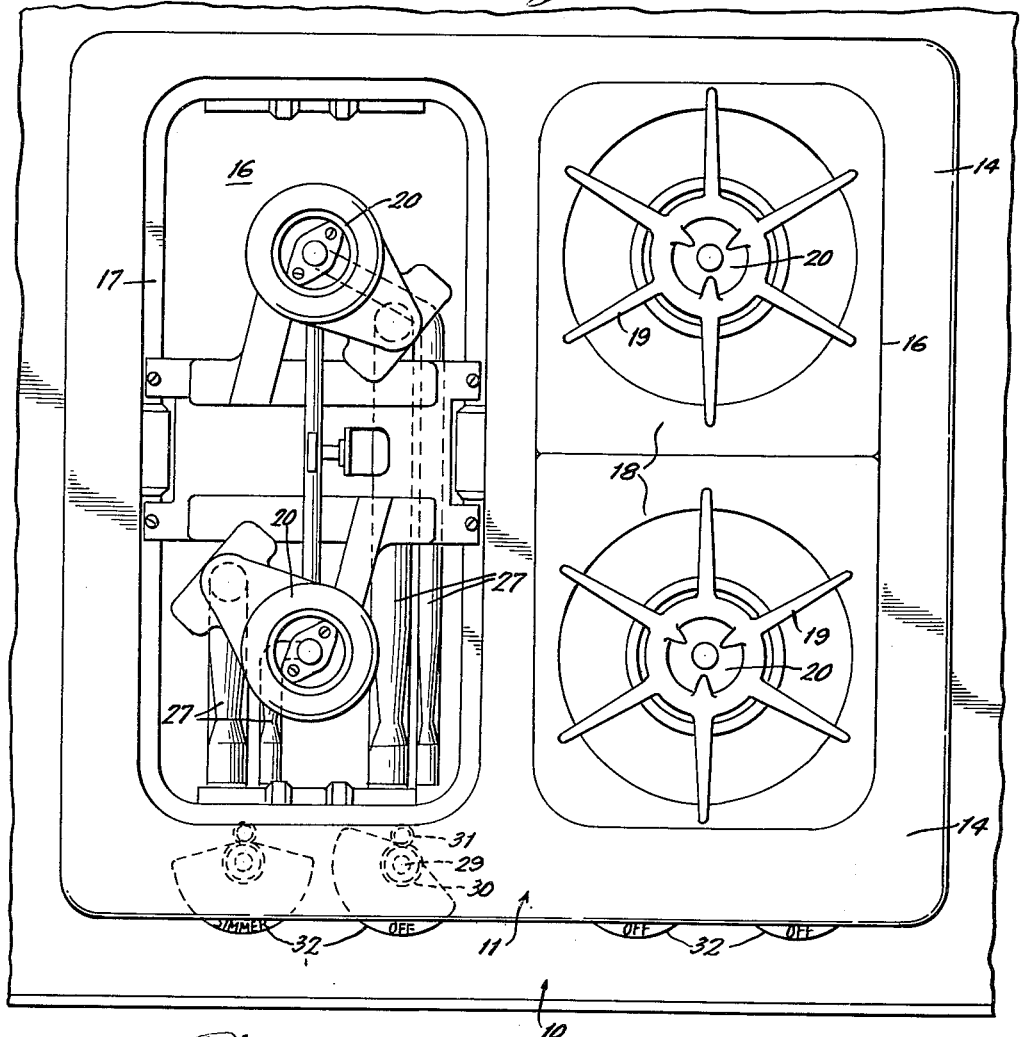
Fig.5
Fig.6
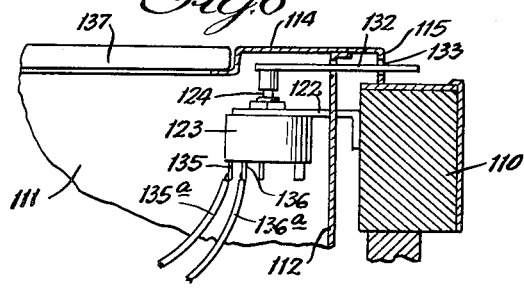
INVENTOR:
George W. Kamin,
BY Dawson, Tilton, Fallon & Lungmus,
ATTORNEYS.

United States Patent Office 3,007,465
Patented Nov. 7, 1961

3,007,465
SURFACE COOKING UNIT
George W. Kamin, Lombard, Ill., assignor to Cribben and Sexton Company, Chicago, Ill., a corporation of Illinois
Filed Apr. 20, 1959, Ser. No. 807,600
3 Claims. (Cl. 126—39)

This invention relates to a surface cooking unit, and, more particularly, to a novel control arrangement in a cooking unit suitable for counter top installation.

A significant advantage of counter top units is that they can be installed in a position where there is adequate side working surface for the housewife and also at a point convenient to drawer or storage space. However, in the past, counter top units have only imperfectly realized the maximum utilization of counter top space while being closely convenient to drawers and other storage space in the counter. Either the unit has occupied an excessive space on the counter top, or it has extended down into the counter-providing structure so as to minimize the usefulness of the storage space. In particular, present counter top units have preempted the space ordinarily occupied by a top drawer—the most desirable space, since this is more convenient to the housewife.

It is an object of this invention to provide a counter top unit which avoids the problems and disadvantages characteristic of previous units of this character. Another object is to provide a counter top unit characterized by occupying minimal top counter space while yet affording the opportunity of having a top drawer, or the like, installed beneath it. A still further object is to provide a counter top unit characterized by minimal horizontal dimensions while also being characterized by a minimal vertical dimension. Yet another object is to provide a counter top unit in which novel structural means are provided for accommodating the controls which also serve an important role in the operation of the unit. Other objects and advantages of this application can be seen as this specification proceeds.

The invention will be described in conjunction with an illustrative embodiment shown in the accompanying drawing, in which:

FIG. 1 is a fragmentary perspective view of a counter top equipped with a gas cooking unit incorporating teachings of this invention;

FIG. 2 is a fragmentary sectional view, taken along the line 2—2 of FIG. 1;

FIG. 3 is a side elevational view of a valve or cock employed in conjunction with the range and which is seen in the opposite elevation in FIG. 2;

FIG. 4 is a rear elevation view of the cock seen in FIG. 3;

FIG. 5 is a fragmentary top plan view of the counter seen in FIG. 1 including the counter top range but with some of the aeration pans removed to disclose the interior of the range;

FIG. 6 is a fragmentary sectional view of a surface unit utilizing electricity for heating.

FIG. 7 is a fragmentary sectional view of another form of the invention and

FIG. 8 is a view similar to FIG. 7 but of still another form of the invention.

In the illustration given, the numeral 10 designates generally a counter, this being seen in various views in FIGS. 1, 2 and 5. Ordinarily, such counters are about waist high, and beneath the top surface are equipped with drawers or doors for the storage of kitchen utensils and the like.

Mounted within an opening provided in the counter top is a gas range designated generally by the numeral 11, also seen in FIGS. 1, 2 and 5. The range 11 is essentially rectangular in construction and includes a rectangular box or casing 12 (best seen in FIG. 2) which is supported by means of a laterally-extending perimetric flange 13 on the counter 10. The box 12 is closed by a cover 14 which is equipped with a depending flange or skirt 15. The depending skirt 15 is spaced outwardly of the flange 13 and rests against the top surface of counter 10 and thereby supports the cover 14. If desired, means not shown such as bolts or springs can be employed for releasably securing the cover 14 in position over the box 12. However, as can be seen in FIG. 2, the skirt 15 is positioned adjacent the flange 13 so that only a limited lateral movement of cover 14 is possible.

In the illustration given, the cover 14 is equipped with two elongated openings 16 (designated only in FIG. 5). These openings 16 are provided by deforming the cover 11 to provide a stepped, inwardly-extending flange 17 (see FIGS. 2 and 5), on which are supported aeration pans 18. In turn, each aeration pan supports a grate 19, which may have the conventional configuration shown in the drawing. Positioned below each grate is a burner element 20 which is capable of supporting a gas flame and heating a utensil (not shown) supported on the grates 19.

Interiorly of the box 12, the range 11 is equipped with a gas supply manifold (see FIG. 2) which extends generally longitudinally of the counter 10 and is positioned adjacent the forward wall 12a of the box 12. For supporting the manifold 21, the forward wall 12a may be provided with a flange clip 22 and suitable straps (not shown).

The manifold in turn supports a plurality of controls or cocks 23 which have upwardly-extending stems 24, as can be seen in FIGS. 3 and 4. In the illustration given, the manifold 21 is threadedly apertured at spaced-apart points along its length, into which an integral nipple 25 provided on cock 23 is threadedly received. Each cock may be provided with a pair of outlets 26 disposed on the side thereof opposite the side equipped with nipple 25. Each outlet 26 is equipped with a gas conduit 27 for supplying gas to burner 20. As can be appreciated from a consideration of FIGS. 2 and 5, one conduit 27 provides gas for the central portion of the burner 20, while the other conduit 27 supplies gas for the usual peripheral openings in burner 20. It is to be appreciated that a single ring burner can be also advantageously employed in conjunction with the inventive structure. Also, the conduits are equipped with the usual Venturi constriction designated 27a in FIG. 2 and the usual air-mixing portion 27b.

Referring now to FIG. 2, the means for controlling the valve 23 can be seen in the upper right hand portion. There, it is to be seen that the top surface of the valve 23 supports a bracket 28. In turn, the bracket 28 pivotally supports a vertically-extending shaft 29, on which is mounted a gear 30. The gear 30 cooperatively engages a gear 31 locked on stem 24 of cock 23. Locked to shaft 29 is a crescent-shaped, manually-positionable handle 32 which can also be seen in FIGS. 1 and 5. The circular segment-shaped handle 32 extends through elongated openings 33 in the front skirt 15 of cover 14. Thus, by positioning the handle 32, the stem 24 is turned and the gas flow through the valve changed.

The remaining portions of the depending skirt 15 may also be equipped with elongated openings such as are designated 34 in FIG. 1. As indicated by the arrows in FIG. 1, the openings in the skirt 15 provide entrance means for combustion air, both the air for the mixer 27b and for the burner 20. Thus, both primary and secondary combustion air are provided through the apertures in the depending side wall or skirt 15 of cover 14. A certain portion of this combustion air flows around the handle segments 32 and is effective to maintain them at a temperature cool to the touch.

In a specific example of the invention, a four-burner cluster such as is seen in the drawing is provided in a generally square topped casing having top dimensions less than 24". At the same time, the distance occupied below the counter top is less than three inches, this representing the depth of the box 12. As can be seen in FIG. 2, the depth of the space occupied by the surface unit is just about that of the counter molding 35. In this manner, there is no interference between the counter top unit and the use of a top drawer 36 in the counter 10. Illustrative of the cocks 23 employed in this arrangement is a No. 1290 valve manufactured by the Harper Wyman Company, of Chicago, Ill.

In the arrangement pictured, a substantial turning action on stem 24 is provided by the gear linkage made up of gears 30 and 31. For example, it is possible to rotate the stem in excess of 180° (thereby placing the cock element for no gas flow, gas flow to the inner burner ring, or to the outer burner ring) by a substantially smaller rotation of the handle segment 32.

It is to be noted that the handle segment 32 is protected against inadvertent turning by the overhang of counter 10, as can be readily appreciated from a consideration of the extreme right-hand portion of FIG. 2. Thus, little children are effectively prevented from touching the burner controls.

In FIG. 6, the teachings of the invention are applied to an electric range. The electric surface unit is designated generally by the numeral 111 and includes a cover 114 secured by bolts (not shown) to a box 112. The cover 114 is equipped with a depending perimetric flange 115 that engages the top of counter 110.

The control for an electric heating element (not shown) may take the form of switch 123 supported by a clip 122 on box 112. The switch is equipped with an upstanding rotatable shaft or post 124 to which is secured a handle 132. As in the case of the gas range, the handle 132 of the electric unit extends through an aperture 133 in the skirt 115. The switch also has the usual terminals 135 and 136 for connection to a conduit source of electricity 135a and conduit 136a leading to an electric burner such as would be placed in the recess 137.

The invention here also contemplates utilizing the control arrangement seen in FIGS. 7 and 8. In FIG. 7, the L-shaped control handle 233 is seen to extend horizontally outwardly as before, but above the cover 214. The handle is partially masked by an inclined cover plate 237 supported above the cover 214 as by a bolt 238.

A similar arrangement is seen in FIG. 8 but where the cover 314 is provided flush with the top of counter 310. Again the control handle 333 extends horizontally but above the cover 314 being protected by a cover plate 237 maintained in place by bolts 238. A trim ring 339 may be interposed between the cover 314 and the counter 310 with integral flanges overlying these elements.

While, in the foregoing specification, I have set forth a detailed description of an embodiment of the invention for the purpose of illustrating the same, many variations of those details will be perceived by those skilled in the art without departing from the spirit and scope of the invention.

I claim:
1. In combination with a counter providing a front edge and having a generally rectangular opening in the top wall thereof adjacent said front edge, a surface cooking unit comprising a generally rectangular open-topped casing, means for supporting said casing on said counter within said opening, a plurality of control-equipped burners within said casing, a cover for said casing having a depending perimetric flange having an edge in contact with the top of said counter, said depending perimetric flange being equipped with apertures about the perimeter thereof, handle means for the controls of said burners extending through the apertures adjacent said front edge and terminating short of the front edge of said counter.

2. In combination with a counter having a generally rectangular opening in the top wall thereof, a surface cooking unit comprising a generally rectangular open-topped casing, means on said casing for supporting the same on said counter within said opening, a plurality of control-equipped burners mounted within said casing, a cover for said casing, said cover being equipped with a depending flange about the cover perimeter and with a plurality of apertures in the flange thereof, some of said apertures being aligned with said controls, and a handle connected to each control and extending through the aperture aligned with said control, said handle being equipped with a horizontal portion extending over a portion of said counter top wall, said handle being movable in a horizontal plane for actuating its associated control.

3. In combination with a counter having a generally rectangular opening in the top wall thereof, a surface cooking unit comprising a generally rectangular open-topped casing having a generally flat, horizontally-disposed bottom wall integrated with four upstanding side walls, means on said casing for supporting the same on said counter within said opening, with said casing bottom wall being positioned about three inches below the counter top wall, a plurality of control-equipped burners mounted within said casing, a cover for said casing, said cover being equipped with a depending flange about the cover perimeter and with a plurality of apertures perimetrically disposed in the flange thereof, some of said apertures being aligned with said controls, and a handle connected to each control and extending through the aperture aligned with said control, said handle being equipped with a horizontal portion extending over a portion of said counter top wall, said handle being movable in a horizontal plane for actuating its associated control.

References Cited in the file of this patent
UNITED STATES PATENTS

| | | |
|---|---|---|
| 810,522 | Eastman | Jan. 23, 1906 |
| 1,127,306 | Starr | Feb. 2, 1915 |
| 1,834,896 | Bruno | Dec. 1, 1931 |
| 1,838,506 | Tinnerman | Dec. 29, 1931 |
| 1,921,762 | Leins | Aug. 8, 1933 |
| 1,973,273 | Teller et al. | Sept. 11, 1934 |
| 1,974,222 | Teller et al. | Sept. 18, 1934 |
| 1,981,084 | Teller et al. | Nov. 20, 1934 |
| 2,806,464 | Williams et al. | Sept. 17, 1957 |
| 2,939,453 | Kamin | June 7, 1960 |